Nov. 15, 1955  W. A. ZABRISKIE  2,723,772
FORK ADJUSTMENT MEANS FOR FORK-LIFT TRUCK
Filed Feb. 15, 1954  2 Sheets-Sheet 1

INVENTOR.
WILLIAM A. ZABRISKIE
BY
Whittemore Hulbert & Belknap
ATTORNEYS

Nov. 15, 1955    W. A. ZABRISKIE    2,723,772
FORK ADJUSTMENT MEANS FOR FORK-LIFT TRUCK
Filed Feb. 15, 1954    2 Sheets-Sheet 2

INVENTOR.
WILLIAM A. ZABRISKIE
BY
*Whittemore Hulbert & Belknap*
ATTORNEYS

United States Patent Office 2,723,772
Patented Nov. 15, 1955

2,723,772

FORK ADJUSTMENT MEANS FOR FORK-LIFT TRUCK

William A. Zabriskie, Detroit, Mich., assignor to Gabriel Steel Company, Detroit, Mich., a corporation of Michigan Application February 15, 1954, Serial No. 410,110

5 Claims. (Cl. 214—730)

The invention relates to fork-lift trucks of that type in which the fork is mounted on a power lift mechanism at the front of the truck and in position for engagement with a load to be handled. It is customary to provide a pair of forks or fork tines which are spaced from each other and to facilitate engagement with various loads, these tines are laterally adjustable on the lifting means to vary the space therebetween. Usually this adjustment is manually performed which necessitates that the driver should leave his seat on the truck every time such adjustment is made.

It is the object of the invention to provide a simple construction operable from the driver's seat for adjusting these tines to various spacings. To this end the invention consists in the construction as hereinafter set forth.

Figure 2:
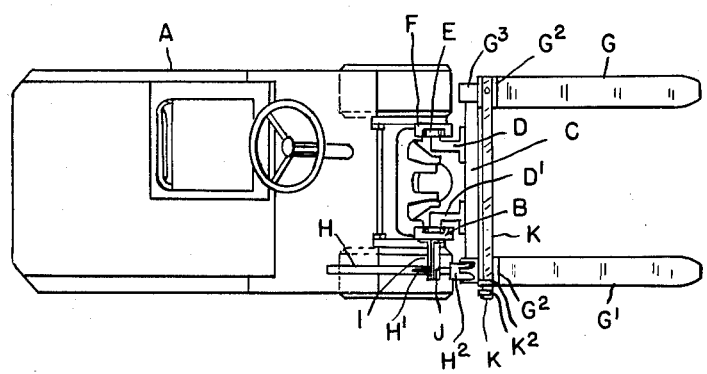
Fig. 2 is a plan view thereof.
Figure 1:
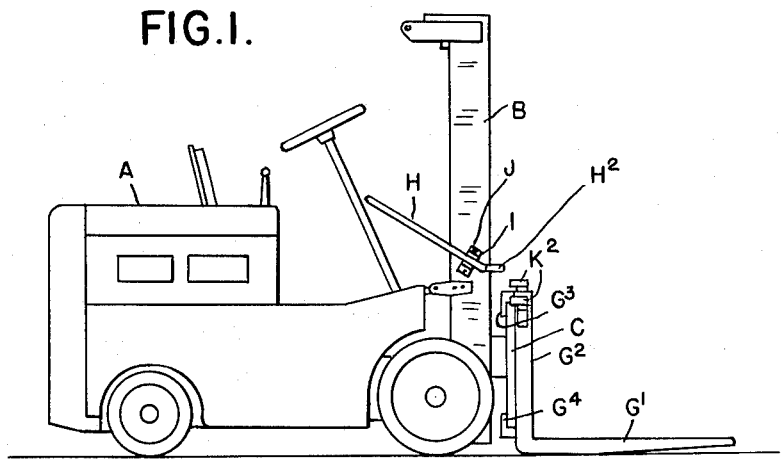
Fig. 1 is a side elevation of a fork-lift truck provided with my improved fork adjusting means.
Figure 3:
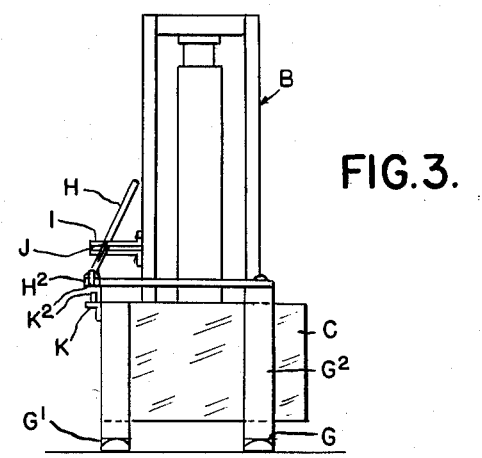
Fig. 3 is a front elevation.
Figure 4:
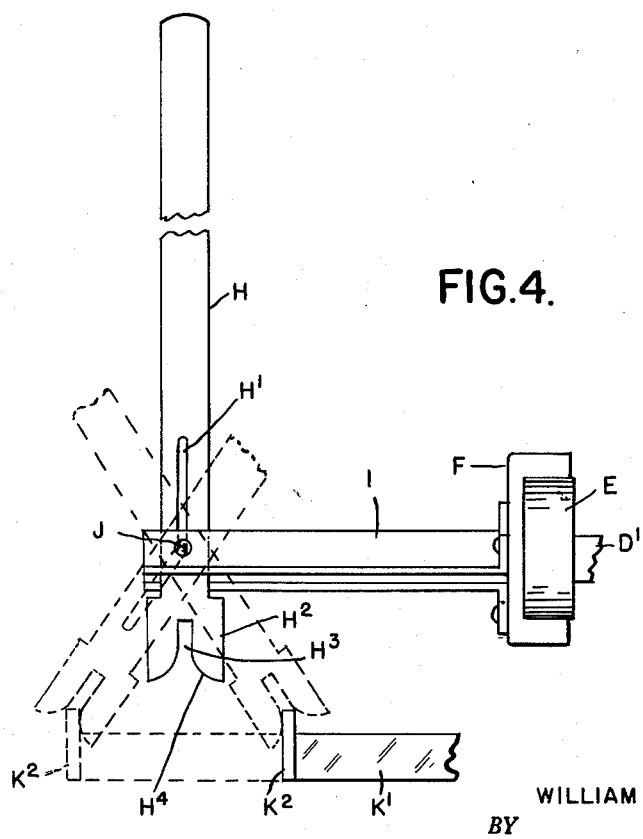
Fig. 4 is a plan view of the fork adjusting lever.

A is a fork lift truck which is provided at its forward end with a mast frame B on which a cross-head C is vertically adjusted by suitable power actuated mechanism (not shown). As illustrated, the cross-head C is formed by a plate extending substantially the full width of the truck and mounted on the mast frame by a pair of arms D, D' having rollers E engaging spaced channel guide members F of the mast. However, any suitable construction may be used which forms no part of the instant invention. The fork comprises a pair of angle members G, G', each having a vertical portion $G^2$ adjacent to the plate cross-head C and laterally adjustably secured thereto by hook members $G^3$, $G^4$ above and below the upper and lower edges thereof. The other portion of each angle member projects horizontally forward and constitutes the lifting tine of the fork.

As thus far described, to adjust the spacing of the tines from each other it is necessary that the operator should manually slide the hooks $G^3$, $G^4$ on the plate C to the desired position. Locking means may be provided for holding the tines in adjusted position but inasmuch as the stresses occurring in the lifting of the load are chiefly vertical there is little need of any locking means. However, each time the tines are adjusted in position the operator must leave his seat on the truck to perform this operation.

As above stated, it is the object of the invention to provide means operable by the driver from his position on the seat through which each of the tines may be adjusted on the plate C so as to be spaced the desired distance from each other. This means comprises essentially a lever which is fulcrumed on the mast or other portion of the truck frame having on one side of the fulcrum an operating handle and on the opposite side means for successively engaging the angle members G, G'. Thus, after engagement if the lever is swung laterally the angle member may be shifted to the desired position.

More in detail the shifting lever H is fulcrumed on a bracket member I which is mounted on one side of the mast to extend laterally outward therefrom. Preferably the bracket I is bifurcated to embrace the lever and is secured thereto by a fulcrum pin J which extends through an elongated slot H' in said lever. The forward end of the lever has a portion $H^2$ extending at an angle thereto so that the lever in the bracket I extends obliquely upward and rearward while the angle portion $H^2$ of the lever extends forward horizontally. This portion has a central slot $H^3$ with a rounded flaring portion $H^4$ at its forward end. Each of the members G, G' has mounted thereon at the upper end of the portion $G^2$ an arm having a portion for engaging the slot $H^3$ of the lever H. One of these arms K is secured to the member G' which is nearest to the position of the lever while the other arm K' extends from the member G to a position slightly above the arm K. Each of these arms is further provided with an upwardly projecting portion $K^2$ which extends longitudinally of the truck so as to be engageable with the slot $H^3$.

With the construction as above described the lever H is normally drawn rearward on the fulcrum pin J, this being permitted by the slot H' and so as to clear the arms K and K', which latter will move vertically when the load is lifted or lowered by the fork. Whenever it is desired to change the spacing of the tines the head C is adjusted vertically by its lifting mechanism to a position where one of the arms K, K' is positioned for engagement of the lever H therewith. The operator then swings the lever H to an angle where the portion $K^2$ of the arm aligns with the slot $H^3$, and by then moving the lever forward on its fulcrum operative engagement is made between the lever and the arm. It is then possible by swinging the lever to shift the fork tine to the desired position. The other tine may then be adjusted by first raising or lowering the head C to the proper level for engagement of the portion $K^2$ of its arm after which swinging of the lever will shift the tine.

My improved fork tine adjusting means is exceedingly simple in its construction and may be easily applied to any standard construction of fork lift truck. It saves time in loading and unloading as it permits of changing the spacing of the tines without necessitating that the driver should leave his seat to effect such adjustment.

What I claim as my invention is:

1. Fork adjusting means for fork-lift trucks of the type including a mast, a head mounted for vertical movement on said mast, and a fork member mounted for lateral adjustment on said head; comprising a bracket attached in fixed position on said mast a lever fulcrumed on said bracket positioned to be operable by the truck operator while in driving position to swing transversely of said head, and a cooperating member on said fork member with which said lever may be moved into direct coupling engagement at a predetermined elevation of said head on said mast, whereby the swinging of said lever will laterally adjust the position of said fork member on said head.

2. The construction as in claim 1 in which said lever is normally positioned to clear said head and fork during vertical movement thereof and has a longitudinally movable engagement with its fulcrum for coupling with or disengagement from said cooperating member.

3. The construction as in claim 2 in which the end of said lever has an open slot with a flaring mouth for engagement with said cooperating member, permitting angular movement of said lever while retaining said engagement.

4. The construction as in claim 1 having a plurality of said fork members, each individually adjustable on said head, said cooperating coupling members being positioned for registration with said lever at different elevations of said head on said mast.

5. The construction as in claim 4 in which said co-operating coupling members are positioned for engagement by said lever within the range of angular movement thereof.

References Cited in the file of this patent

UNITED STATES PATENTS

| | | |
|---|---|---|
| 1,813,597 | Abbe | July 7, 1931 |
| 2,420,828 | King | May 20, 1947 |
| 2,483,745 | Vossenberg | Oct. 4, 1949 |
| 2,655,278 | Daniels | Oct. 13, 1953 |
| 2,665,021 | Wight, Jr. | Jan. 5, 1954 |
| 2,668,602 | Cushman | Feb. 9, 1954 |